US011946596B2

(12) United States Patent
Zanella, Jr. et al.

(10) Patent No.: US 11,946,596 B2
(45) Date of Patent: Apr. 2, 2024

(54) AIR TANK LOCKING MECHANISM

(71) Applicant: MSA Technology, LLC, Cranberry Township, PA (US)

(72) Inventors: Mark Flori Zanella, Jr., Beaver, PA (US); Aaron Jewitt, Valencia, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 337 days.

(21) Appl. No.: 17/375,036

(22) Filed: Jul. 14, 2021

(65) Prior Publication Data

US 2023/0019536 A1 Jan. 19, 2023

(51) Int. Cl.

*F17C 13/08* (2006.01)
*A62B 9/04* (2006.01)
*A62B 25/00* (2006.01)

(52) U.S. Cl.

CPC .............. *F17C 13/084* (2013.01); *A62B 9/04* (2013.01); *A62B 25/00* (2013.01); *F17C 2201/032* (2013.01); *F17C 2201/058* (2013.01); *F17C 2205/0103* (2013.01); *F17C 2205/0126* (2013.01); *F17C 2205/0173* (2013.01); *F17C 2223/0123* (2013.01); *F17C 2270/025* (2013.01); *F17C 2270/079* (2013.01)

(58) Field of Classification Search

CPC .............. F17C 13/084; F17C 2201/032; F17C 2201/058; F17C 2205/0103; F17C 2205/0126; F17C 2205/0173; F17C 2223/0123; F17C 2270/025; F17C 2270/079; F17C 1/00; F17C 2201/0109; F17C 2205/0157; F17C 2205/0188; F17C 2205/0329; F17C 2205/0338; F17C 2221/031; F17C 2223/036; A62B 9/04; A62B 25/00

USPC .......................................................... 248/313

See application file for complete search history.

(56) References Cited

U.S. PATENT DOCUMENTS 3,285,650 A 11/1966 Dukes
5,080,414 A 1/1992 Hellquist et al.
2007/0175470 A1 * 8/2007 Brookman ............. A62B 25/00 128/200.14

(Continued)

OTHER PUBLICATIONS

Patent Cooperation Treaty, PCT/US2022/036892, International Search Report and Written Opinion, dated Feb. 7, 2023.

*Primary Examiner* — Muhammad Ijaz
(74) *Attorney, Agent, or Firm* — Jones Day

(57) ABSTRACT

A self-contained breathing apparatus includes at least one air tank having a regulator, and a back plate configured to removably receive the air tank. The back plate has a plate having a tank engagement surface for engaging at least a portion of an air tank, a receiving cradle on the plate configured to receive the regulator of an air tank, and a locking mechanism associated with the cradle and/or the plate for releasably locking the regulator and/or the cradle relative to the plate. The locking mechanism has at least one locking member configured to move between a first locked position, wherein the locking member engages the regulator and/or cradle to restrict removal of the regulator and/or the receiving cradle from the plate, and a second unlocked position, wherein the locking member disengages from the regulator and/or the cradle to permit removal of the regulator and/or the cradle from the plate.

20 Claims, 6 Drawing Sheets

(56) References Cited

U.S. PATENT DOCUMENTS

| | | | | |
|---|---|---|---|---|
| 2011/0272975 | A1* | 11/2011 | Hogg | F17C 13/084 224/567 |
| 2012/0217278 | A1 | 8/2012 | Bostrom et al. | |
| 2015/0144674 | A1 | 5/2015 | Losos et al. | |
| 2018/0117372 | A1* | 5/2018 | Mesman | A62B 9/04 |
| 2019/0151689 | A1* | 5/2019 | Peng | A62B 25/00 |
| 2023/0019536 | A1* | 1/2023 | Zanella, Jr. | F17C 13/084 |

* cited by examiner

AIR TANK LOCKING MECHANISM

BACKGROUND

Technical Field

The present disclosure relates generally to an air tank locking mechanism and, in particular, a locking mechanism for securing an air tank to a harness back plate of a self-contained breathing apparatus (SCBA).

Technical Considerations

As is known in the art, there exist various self-contained breathing apparatuses (SCBAs) that provide an air tank attached to a back plate that can be worn by a user. SCBAs are commonly used in many industries, including the fire-fighting industries. Firefighters often utilize SCBAs when entering dangerous areas, such as structures which are on fire or areas where there is expected gas leaks, making breathing without the SCBAs hazardous and potentially lethal. In current SCBAs, the air tank is held in the SCBA by a strap that goes around the circumference of the air tank. The strap prevents the air tank from moving in the radial direction relative to the harness back plate. However, a problem with the current strap method of securing the air tank is that the strap method does not prevent the air tank from moving in the axial direction (i.e., in the vertical direction). Firefighters often move around, under, and over objects that may cause at least a portion of the air tank to strike an object. Such contact may cause the air tank to move in the axial direction and become dislodged from the harness back plate.

There is a need for an SCBA that is capable of securing the air tank to prevent axial movement of the air tank.

SUMMARY

Generally, provided is an improved SCBA that may have at least one air tank having a regulator, a wearable harness with a back plate configured to removably receive the at least one air tank. The back plate may have a plate configured for positioning on a user's back, the plate having a tank engagement surface for engaging at least a portion of the at least one air tank, a receiving cradle on the plate configured to receive the regulator of the at least one air tank, and a locking mechanism associated with the cradle for releasably locking the regulator in the cradle. The locking mechanism may have at least one locking member configured to move between a first locked position, wherein the at least one locking member engages the regulator to restrict removal of the regulator from the receiving cradle, and a second unlocked position, wherein the at least one locking member disengages from the regulator to permit removal of the regulator from the cradle.

In some non-limiting embodiments or aspects, the locking mechanism of the SCBA may have a biasing member configured for biasing the at least one locking member into the locked position. The biasing member may be a spring. In non-limiting embodiments, the at least one locking member is moveable linearly. In other non-limiting embodiments, the locking member is rotatable about a pivot point.

In some non-limiting embodiments or aspects, the locking mechanism of the SCBA may have a latching end opposite a controlling end, the latching end may be configured for engaging the regulator in the first locked position, and the controlling end may be configured for facilitating movement of the at least one locking member from the first locked position to the second unlocked position. The at least one locking member may be moveable to the second unlocked position due to linear or pivoting movement of the controlling end.

Also provided is an improved back plate for a wearable harness configured to receive at least one air tank. The back plate may be configured for position on a user's back, the plate having a tank engagement surface configured for engaging at least a portion of the at least one air tank, a receiving cradle on the plate configured to receive a regulator of the at least one air tank and a locking mechanism associated with the cradle for releasably locking the regulator in the cradle. The locking mechanism may have at least one locking member configured to move between a first locked position, wherein the at least one locking member engages the regulator to restrict removal of the regulator from the receiving cradle, and a second unlocked position, wherein the at least one locking member disengages from the regulator to permit removal of the regulator from the cradle.

In some non-limiting embodiments or aspects, the locking mechanism of the back plate may have a biasing member configured for biasing the at least one locking member into the locked position. The biasing member may be a spring. In non-limiting embodiments, the at least one locking member is moveable linearly. In other non-limiting embodiments, the locking member is rotatable about a pivot point.

In some non-limiting embodiments or aspects, the locking mechanism of the back plate may have a latching end opposite a controlling end, the latching end may be configured for engaging the regulator in the first locked position, and the controlling end may be configured for facilitating movement of the at least one locking member from the first locked position to the second unlocked position. The at least one locking member may be moveable to the second unlocked position due to linear or pivoting movement of the controlling end.

Also provided is a locking mechanism for securing a regulator of an air tank to a back plate assembly of a self-contained breathing apparatus. The locking mechanism may have at least one locking member comprising a latching end opposite a controlling end and at least one biasing member for biasing at least a portion of the at least one locking member. The at least one locking member may be movable between a first locked position where the latching end may be configured to engage the regulator to prevent movement of the regulator relative to the latching end, and a second unlocked position where the latching end is configured to disengage the regulator to permit movement of the regulator relative to the latching end. The controlling end may be configured for facilitating movement of the latching end and the at least one biasing member may be configured to bias the latching end to the first position.

In some non-limiting embodiments or aspects, the latching end of the locking mechanism may have a sloped surface configured for automatically moving the at least one locking member out of the locked position during the insertion of the regulator into the receiving cradle. The at least one locking member may be movable to the second unlocked position due to linear or pivoting movement of the controlling end. The biasing member may be a spring.

Further non-limiting embodiments or aspects are set forth in the following numbered clauses:

Clause 1: A self-contained breathing apparatus (SCBA) comprising: at least one air tank having a regulator; a wearable harness with a back plate configured to removably receive the at least one air tank, the back plate comprising: a plate configured for positioning on a user's back, the plate having a tank engagement surface for engaging at least a portion of the at least one air tank; a receiving cradle on the plate configured to receive the regulator of the at least one air tank; and a locking mechanism associated with at least one of the plate and the receiving cradle for releasably locking the regulator and the receiving cradle relative to the plate, the locking mechanism comprising at least one locking member configured to move between a first locked position, wherein the at least one locking member engages at least one of the regulator and the receiving cradle to restrict removal of the regulator and the receiving cradle from the plate, and a second unlocked position, wherein the at least one locking member disengages from at least one of the regulator and the receiving cradle to permit removal of at least one of the regulator and the receiving cradle from the plate.

Clause 2: The SCBA of Clause 1, wherein the locking mechanism further comprises a biasing member configured for biasing the at least one locking member into the locked position.

Clause 3: The SCBA of Clause 1 or 2, wherein the biasing member is a spring.

Clause 4: The SCBA of any of Clauses 1-3, wherein the at least one locking member is movable linearly.

Clause 5: The SCBA of any of Clauses 1-4, wherein the at least one locking member is rotatable about a pivot point.

Clause 6: The SCBA of any of Clauses 1-5, wherein the at least one locking member comprises a latching end opposite a controlling end, wherein the latching end is configured for engaging the regulator in the first locked position, and wherein the controlling end is configured for facilitating movement of the at least one locking member from the first locked position to the second unlocked position.

Clause 7: The SCBA of any of Clauses 1-6, wherein the latching end has a sloped surface configured for automatically moving the at least one locking member out of the locked position during the insertion of the regulator into the receiving cradle or during the insertion of the receiving cradle into a cradle receiving arrangement on the plate.

Clause 8: The SCBA of any of Clauses 1-7, wherein the at least one locking member is movable to the second unlocked position due to linear or pivoting movement of the controlling end.

Clause 9: A back plate for a wearable harness configured to receive at least one air tank, the back plate comprising: a plate configured for positioning on a user's back, the plate having a tank engagement surface configured for engaging at least a portion of the at least one air tank; a receiving cradle on the plate configured to receive a regulator of the at least one air tank; and a locking mechanism associated with at least one of the plate and the receiving cradle for releasably locking the regulator and the receiving cradle relative to the plate, the locking mechanism comprising at least one locking member configured to move between a first locked position, wherein the at least one locking member engages at least one of the regulator and the receiving cradle to restrict removal of the regulator and the receiving cradle from the plate, and a second unlocked position, wherein the at least one locking member disengages from the at least one of the regulator and the receiving cradle to permit removal of at least one of the regulator and the receiving cradle from the plate.

Clause 10: The back plate of Clause 9, wherein the locking mechanism further comprises a biasing member configured for biasing the at least one locking member into the locked position.

Clause 11: The back plate of Clause 9 or 10, wherein the biasing member is a spring.

Clause 12: The back plate of any of Clauses 9-11, wherein the at least one locking member is movable linearly.

Clause 13: The back plate of any of Clauses 9-12, wherein the at least one locking member is rotatable about a pivot point.

Clause 14: The back plate of any of Clauses 9-13, wherein the at least one locking member comprises a latching end opposite a controlling end, wherein the latching end is configured for engaging the regulator in the first locked position, and wherein the controlling end is configured for facilitating movement of the at least one locking member from the first locked position to the second unlocked position.

Clause 15: The back plate of any of Clauses 9-14, wherein the latching end has a sloped surface configured for automatically moving the at least one locking member out of the locked position during the insertion of the regulator into the receiving cradle or during the insertion of the receiving cradle into a cradle receiving arrangement on the plate.

Clause 16: The back plate of any of Clauses 9-15, wherein the at least one locking member is movable to the second unlocked position due to linear or pivoting movement of the controlling end.

Clause 17: A locking mechanism for securing a regulator of an air tank to a back plate assembly of a self-contained breathing apparatus, the locking mechanism comprising: at least one locking member comprising a latching end opposite a controlling end; and at least one biasing member for biasing at least a portion of the at least one locking member, wherein the at least one locking member is movable between a first locked position, wherein the latching end is configured to engage the regulator to prevent movement of the regulator relative to the latching end, and a second unlocked position, wherein the latching end is configured to disengage the regulator to permit movement of the regulator relative to the latching end, wherein the controlling end is configured for facilitating movement of the latching end, and wherein the at least one biasing member is configured to bias the latching end to the first position.

Clause 18: The locking mechanism of Clause 17, wherein the latching end has a sloped surface configured for automatically moving the at least one locking member out of the locked position during the insertion of the regulator into the receiving cradle or during the insertion of the receiving cradle into a cradle receiving arrangement on the plate.

Clause 19: The locking mechanism of Clause 17 or 18, wherein the at least one locking member is movable to the second unlocked position due to linear or pivoting movement of the controlling end.

Clause 20: The locking mechanism of any of Clauses 17-19, wherein the biasing member is a spring.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. Hence, specific dimensions and other physical characteristics related to the embodiments disclosed herein are not to be considered as limiting. Further, it is to be understood that the disclosure may assume various alternative variations and step sequences, except where expressly specified to the contrary.

BRIEF DESCRIPTION OF THE DRAWINGS

In FIGS. 1-6C, like characters refer to the same components and elements, as the case may be, unless otherwise stated.

DETAILED DESCRIPTION

Figure 1:
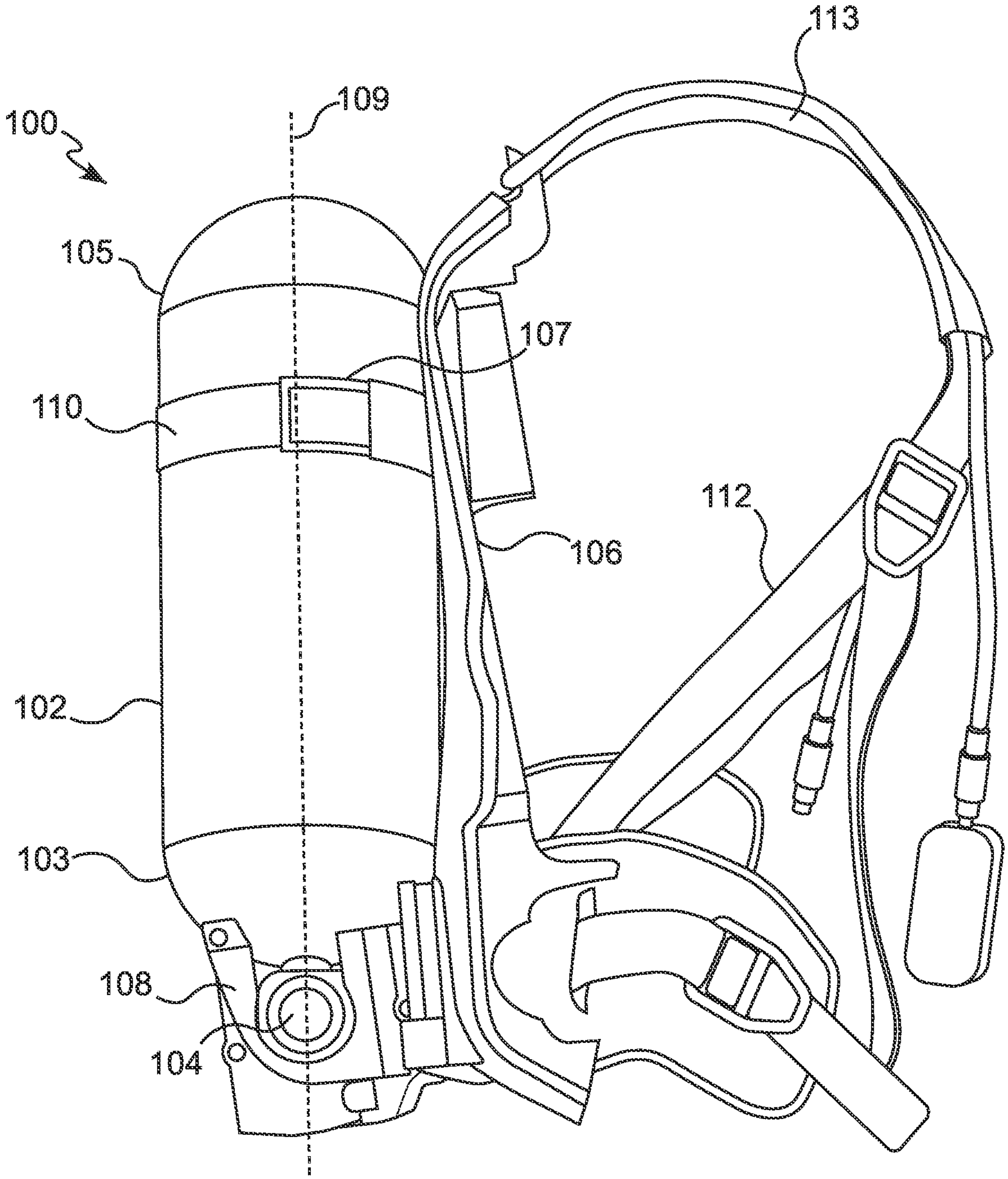
FIG. 1 is a side view of a harness and a self-contained breathing apparatus in accordance with some non-limiting embodiments or aspects of the present disclosure.

For purposes of the description hereinafter, the terms “end”, “upper”, “lower”, “right”, “left”, “vertical”, “horizontal”, “top”, “bottom”, “up”, “down”, “lateral”, “longitudinal” and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

All numbers and ranges used in the specification and claims are to be understood as being modified in all instances by the term “about”. By “about” is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of “1 to 10” should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms “first”, “second”, and the like are not intended to refer to any particular order or chronology, but refer to different conditions, properties, or elements.

The term “at least” is synonymous with “greater than or equal to”.

As used herein, “at least one of” is synonymous with “one or more of”. For example, the phrase “at least one of A, B, and C” means any one of A, B, or C, or any combination of any two or more of A, B, or C. For example, “at least one of A, B, and C” includes one or more of A alone; or one or more B alone; or one or more of C alone; or one or more of A and one or more of B; or one or more of A and one or more of C; or one or more of B and one or more of C; or one or more of all of A, B, and C.

As used herein, the terms “parallel” or “substantially parallel” mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms “perpendicular” or “substantially perpendicular” mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

In the present document, the word “exemplary” is used herein to mean “serving as an example, instance, or illustration.” Any embodiment or implementation of the present subject matter described herein as “exemplary” is not necessarily to be construed as preferred or advantageous over other embodiments.

The terms “comprises”, “comprising”, or any other variations thereof, are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by “comprises . . . a” does not, without more constraints, preclude the existence of other elements or additional elements in the system or method.

The terms “includes”, “including”, or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

The terms "an embodiment", "embodiment", "embodiments", "the embodiment", "the embodiments", "one or more embodiments", "some non-limiting embodiments or aspects", and "one embodiment" mean "one or more (but not all) embodiments of the invention(s)" unless expressly specified otherwise. A description of an embodiment with several components in communication with each other does not imply that all such components are required. On the contrary, a variety of optional components is described to illustrate the wide variety of possible embodiments of the disclosure.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As discussed herein, certain operations may be performed in a different order, modified, or removed. Moreover, steps may be added to methods described herein and still conform to the described embodiments. Further, operations described herein may occur sequentially or certain operations may be processed in parallel. Yet further, operations may be performed by a single processing unit or by distributed processing units.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

With reference to FIG. 1, shown is a Self-Contained Breathing Apparatus (SCBA) 100 in accordance with some non-limiting embodiments or aspects. An SCBA 100 may contain at least one air tank 102, a back plate 106 for securing the at least one air tank 102, and a harness 112 to which the back plate 106 with the at least one air tank 102 is connected to. The at least one air tank 102 may have a substantially cylindrical shape having a lower end 103 spaced apart from an upper end 105 in a direction along a longitudinal axis 109. The at least one air tank 102 has an air tank regulator 104 located at the lower end 103. The air tank regulator 104 is configured to deliver breathable air from the tank 102 to a facepiece worn by the user via a hose and one or more additional regulators. The at least one air tank 102 may be secured to the back plate 106 by a strap 110. For example, the upper end 105 of the at least one air tank 102 may be held by the strap 110 in order to prevent movement of the at least one air tank 102 relative to the back plate 106. The strap 110 may extend around the outer circumference of the air tank 102. In some non-limiting embodiments or aspects, the strap 110 may have a clamp 107 in order to secure the air tank 102 to the back plate 106. In some non-limiting embodiments or aspects, the clamp 107 may be movable between a locked position configured for preventing movement of the at least one air tank 102 relative to the back plate 106, and an unlocked position configured for permitting movement of the at least one air tank 102 relative to the back plate 106, such as during loading and/or unloading of the at least one air tank 102 to/from the back plate 106. In some non-limiting embodiments or aspects, the strap 110 may prevent the air tank 102 from rotating about its longitudinal axis 109.

With continued reference to FIG. 1, the back plate 106 may also have a cradle 108 configured for receiving the air tank regulator 104 at the lower end 103 of the at least one air tank 102. The cradle 108 may be secured to the back plate 106 or be integrally formed therewith. In some non-limiting embodiments or aspects, the cradle 108 may be configured to prevent the air tank regulator 104 from moving relative to the back plate 106 in a direction along the longitudinal axis 109 of the at least one air tank 102. In some embodiments or aspects, the cradle 108 may be removably connectable with the back plate 106. For example, the cradle 108 may be configured for connecting with the air tank regulator 104 prior to connecting the cradle 108 and air tank regulator 104 assembly to the back plate 106.

With continued reference to FIG. 1, the harness 112 may be secured to the back plate 106. The harness 112 has a pair of shoulder straps 113 that allow the user to wear the SCBA 100 like a backpack. When worn by the user, the back plate 106 rests on the back of the user. The harness 112 may be adjustable such that it may be tightened or loosened to fit securely on the user's body. The harness 112 may include a latching mechanism for securing the harness 112 to the user's body. In some non-limiting embodiments or aspects, the latching mechanism may removably secure the shoulder straps 113 to each other.

Figure 2:
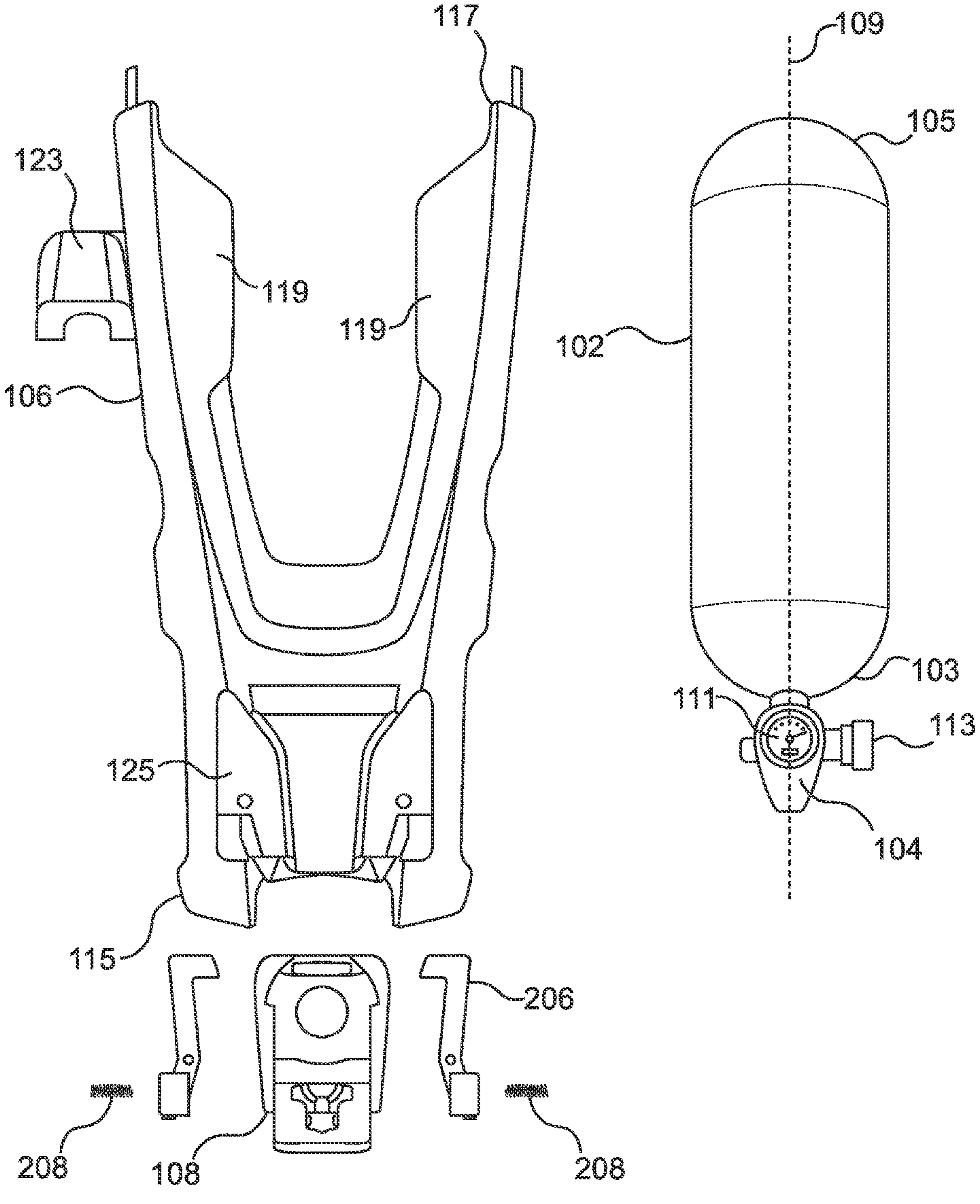
FIG. 2 is an exploded perspective view of a back plate and an air tank of a self-contained breathing apparatus in accordance with some non-limiting embodiments or aspects of the present disclosure.

With reference to FIG. 2, shown is a non-limiting embodiment or aspect of the at least one air tank 102 and the back plate 106. The at least one air tank 102 may be identical to the at least one air tank 102 shown in FIG. 1. As shown in FIG. 2, the air tank regulator 104 may be attached to the at least one air tank 102, for example using a threaded connector. In some non-limiting embodiments or aspects, the air tank regulator 104 may include a gauge 111 to indicate the amount of air remaining in the at least one air tank 102. A valve 113 may be provided for controlling the flow of air out of the at least one air tank 102.

Figure 3C:
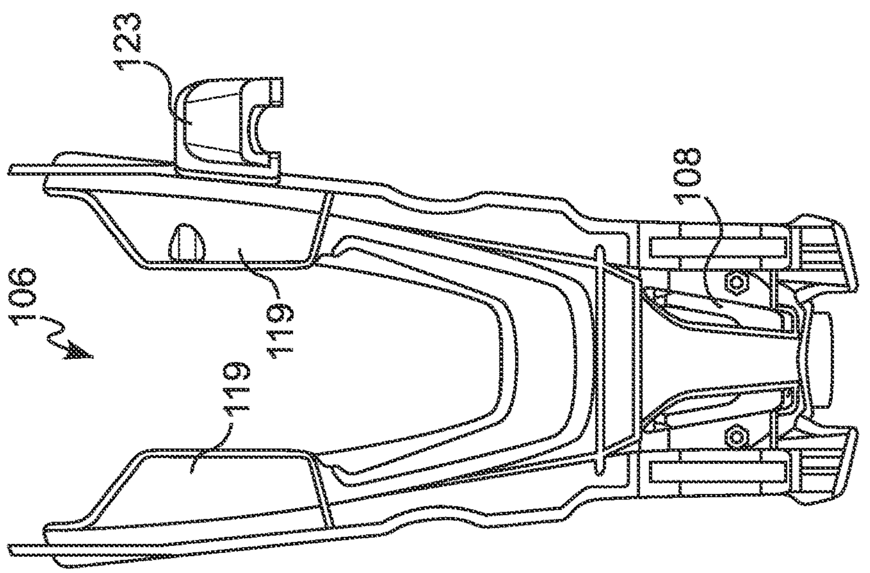
FIG. 3C is a rear view of the portion of the back plate shown in FIG. 3A.
Figure 3B:
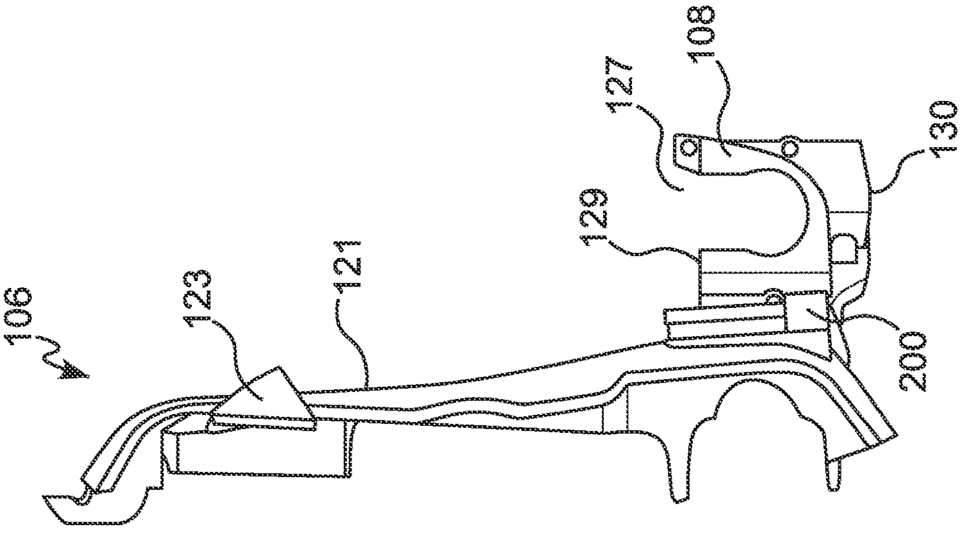
FIG. 3B is a side view of the portion of the back plate shown in FIG. 3A.
Figure 3A:
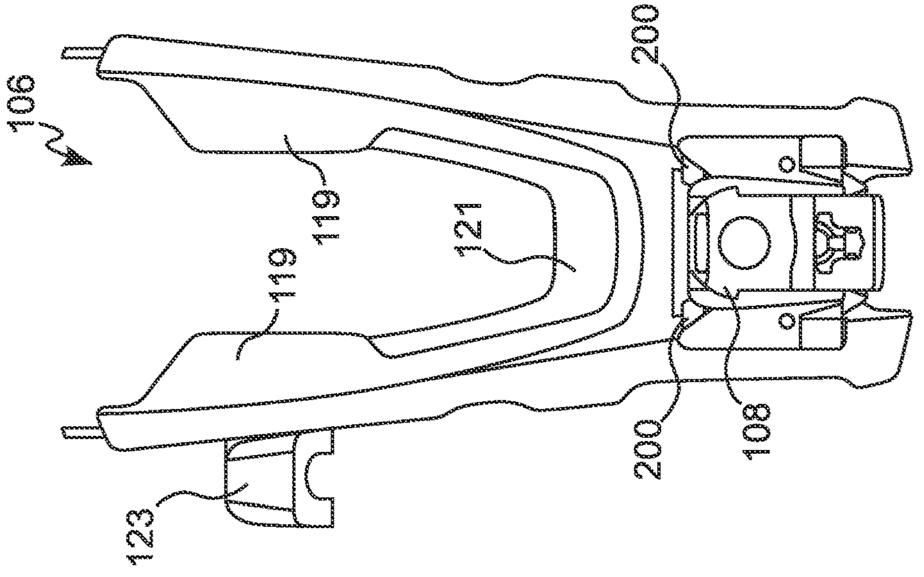
FIG. 3A is a front view of a portion of a back plate for a self-contained breathing apparatus in accordance with some non-limiting embodiments or aspects of the present disclosure.

With reference to FIGS. 3A-3C, and with continued reference to FIG. 2, the back plate 106 has a first end 115 having the cradle 108 and a second end 117 opposite the first end 115. In some non-limiting embodiments or aspects, the back plate 106 may have V-shape with the cradle 108 provided at the bottom of the V and a pair of arms 119 extending away from each other in a direction away from the cradle 108. The cradle 108 has a locking mechanism 200 configured for selectively locking at least a portion of the at least one air tank 102 to prevent movement thereof relative to the back plate 106 in a direction along the longitudinal axis 109 of the at least one air tank 102. In some non-limiting embodiments or aspects, the locking mechanism 200 may be provided directly on the back plate 106 and may be configured to removably lock the cradle 108 to the back plate 106. In some non-limiting embodiments or aspects, the locking mechanism 200 may have at least one locking member 206 configured for engaging the air tank regulator 104 and/or the cradle 108 in a way so as to prevent movement thereof relative to the back plate 106 in a direction along the longitudinal axis 109 of the at least one air tank 102. The locking mechanism 200 may be movable between a locked position, in which movement of the at least one air tank 102 and/or the cradle 108 relative to the back plate 106 is prevented or restricted, and an unlocked position, in which movement of the at least one air tank 102 and/or the cradle 108 relative to the back plate 106 is permitted.

With continued reference to FIGS. 2-3C, the back plate 106 may have a tank engagement surface 121 configured to contact at least a portion of the at least one air tank 102 when the at least one air tank 102 is loaded onto the back plate 106. In some non-limiting embodiments or aspects, the tank engagement surface 121 may be shaped to correspond to an outside shape of the at least one air tank 102. As shown in FIG. 2, the cradle 108 may be removably secured to the back plate 106 by the engagement with a cradle receiving arrangement 125 on the first end 115 of the back plate 106. In some non-limiting embodiments or aspects, the cradle receiving arrangement 125 may be a groove on the back plate 106 that is configured to removably receive a corresponding tongue on the cradle 108. In other embodiments or aspects, the cradle receiving arrangement 125 may include one or more fasteners for removably securing the cradle 108 to the back plate 106.

In some non-limiting embodiments or aspects, the cradle 108 may be shaped to define a cradle cavity 127. The cavity 127 may be configured to receive at least a portion of the at least one air tank 102, such as the air tank regulator 104. The cradle cavity 127 may be defined by two or more walls 129 of the cradle 108. The walls 129 may be parallel to the tank longitudinal axis 109. In some non-limiting embodiments or aspects, the cradle 108 may have a base 130 that is spaced apart from the back plate 106 and is configured to provide shielding to the air regulator 104, such as by surrounding at least a portion of the air regulator 104 in order to protect the air tank regulator 104. The base may be perpendicular to the tank longitudinal axis 109. The walls 129 may be located on opposite sides of the base 130, or the walls 129 may be connected to each other. The cradle base 130 may connect two or more walls 129 of the cradle 108. The cradle base 130 may have a cushioned pad for receiving the air tank regulator 104. One or more walls 129 may have an indentation in the top of the wall. The indentation of the wall may provide for access to the air tank regulator 104, or may allow a portion of the air tank regulator 104 to extend outside of the cradle walls. A cradle wall 129 may be located opposite of the back plate 106. The wall opposite the back plate 106 may providing shielding of the air tank regulator 104, protecting the regulator from potential hazards such as being struck.

With continued reference to FIGS. 2-3C, the locking mechanism 200 may be operatively associated with the back plate 106 and/or the cradle 108. In some non-limiting embodiments, the locking mechanism 200 may be associated with the cradle 108 such that the locking mechanism 200 is positioned to allow interaction with the air tank regulator 104. For example, the locking mechanism 200 may be positioned to allow selective engagement with the air tank regulator 104 to prevent its removal from the cradle 108 when the locking mechanism 200 is in the locked position and permit its removal from the cradle 108 when the locking mechanism is in the unlocked position.

Figures 4A, 4B:
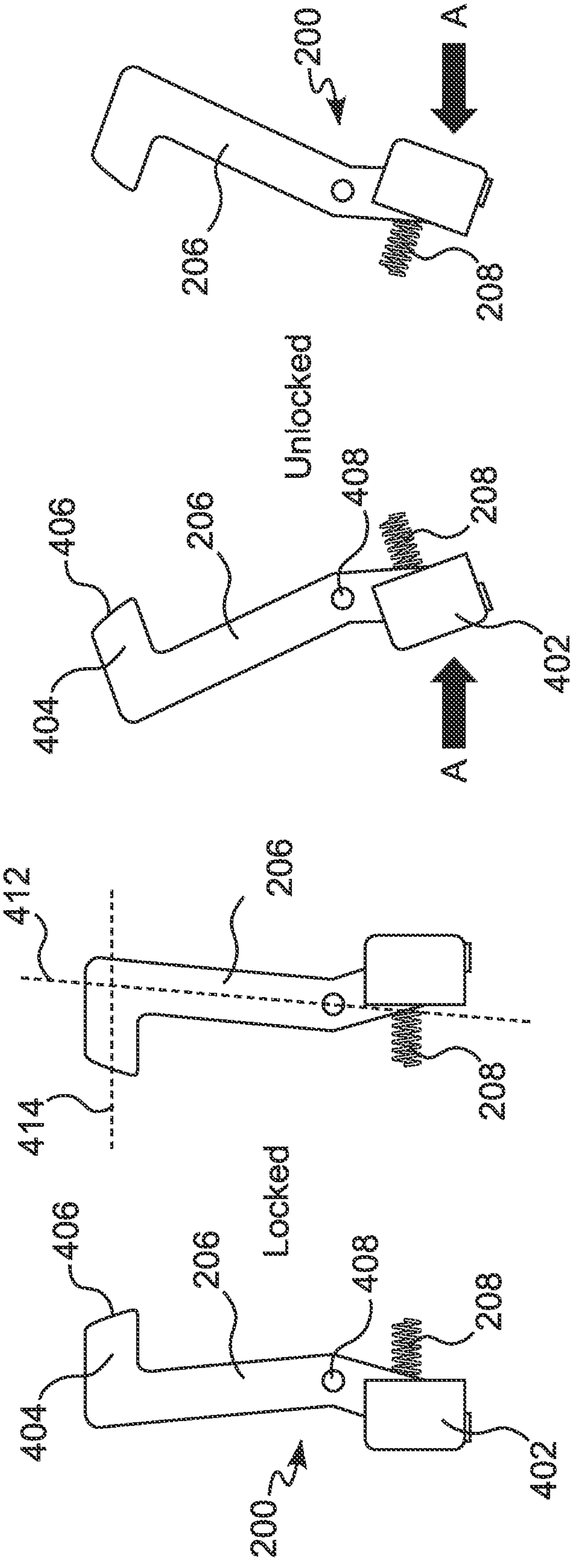
FIG. 4A is a front view of a locking mechanism for securing an air tank to a back plate of a self-contained breathing apparatus in accordance with some non-limiting embodiments or aspects of the present disclosure, with the locking mechanism shown in a locked position.
FIG. 4B is a front view of the locking mechanism of FIG. 4A shown in an unlocked position.

With reference to FIGS. 4A-B, the locking mechanism 200 includes at least one locking member 206. In some non-limiting embodiments or aspects, the locking mechanism 200 may have a pair of locking members 206. Each locking member 206 may be configured for moving between a first or locked position and a second or unlocked position. In the locked position, the at least one locking member 206 may be configured to engage the at least a portion of the air tank regulator 104 to prevent removal of the air tank 102 from the cradle 108. Conversely, in the unlocked position, the at least one locking member 206 may be configured to disengage from the air tank regulator 104 to permit removal of the air tank 102 from the cradle 108, such as by moving the air tank 102 vertically upward in a direction along its longitudinal axis 109. In some non-limiting embodiments, at least a portion of each locking member 206 may be configured to engage with a tank neck above the air tank regulator 104 (shown in FIGS. 5A-5C).

With reference to FIGS. 4A-4B, the locking mechanism 200 may be biased to the locked position. In some non-limiting embodiments or aspects, the locking mechanism 200 may have a biasing member 208 for biasing the at least one locking member 206 to the locked position. In some embodiments or aspects, the biasing member 208 may be attached to the locking member 206. In some non-limiting embodiments or aspects, the biasing member may be attached to the back plate 106 or cradle 108. In some non-limiting embodiments or aspects, the biasing member 208 may be a spring, such as a torsion, a compression spring, or an extension spring. When the spring is decompressed or compressed to a first state, the spring may keep the locking member 206 in the locked position. When the compression spring becomes compressed from the decompressed state or the first state to a second state, such as due to movement of the locking member 206 from the first position toward the second position, a restoring force is built up in the spring to urge the spring back toward the decompressed state or the first state. Similarly, when an extension spring is extended from a first state to an extended or second state, such as due to movement of the locking member 206 from the first position toward the second position, a restoring force is built up in the spring to urge the spring back toward the first state. In case of a torsion spring, movement of the locking member 206 from the first position toward the second position may cause a first end of the torsion spring to rotate relative to a second end, thereby increasing the stored potential energy of the spring. In each instance, the biasing member 208 returns the locking member 206 toward the first, locked position after the urging force on the locking member 206 is removed. In some non-limiting embodiments or aspects, the biasing member 208 may be an elastic band, elastic member, or a magnet.

In some non-limiting embodiments or aspects, the locking member 206 may be movable be pivotally movable, rotatably movable, linearly movable, or movable in any direction via any combination of pivotal, rotatable, and linear movement between the first position and the second position. In some non-limiting embodiments or aspects, the locking member 206 may be pivotally moved about a pivot point 408. The pivot point 408 may be a partial length down the longitudinal axis 412 of the locking member 206. The locking member 206 may be attached to the back plate 106 or the cradle 108 through a through hole located at the pivot point 408. The back plate 106 and/or cradle 108 may have a corresponding through hole such that one or more fasteners may secure the locking member 206 to the back plate 106 and/or cradle 108 through the through hole. The fastener may be a pin or any other member configured or adapted to mate the locking member 206 to the back plate 106 and/or cradle 108. In some non-limiting embodiments or aspects, the cradle 108 may be removable from the back plate 106 and the locking member 206 may be configured to releasably retain the cradle 108 on the back plate 106. In such embodiments, the cradle 108 may be connected to the air tank regulator 104 prior to connecting the cradle 108 to the back plate 106.

In non-limiting embodiments or aspects, the locking member 206 may comprise of a latching end 404 opposite a controlling end 402. At least a portion of the latching end 404 may protrude from the locking member 206 along a lateral axis 414. The latching end 404 is configured to releasably engage at least a portion of the air regulator 104 and/or the cradle 108 in the locked position. The latching end 404 is movable between a first, locked position, where removal of the air regulator 104 from the cradle 108 is prevented due to interference between at least a portion of the latching end 404 and the air regulator 104 and/or the cradle 108, and a second, unlocked position, where the air tank regulator 104 can be removed freely from the cradle 108. In non-limiting embodiments, the latching end 404 may engage with the air tank regulator 104 by reaching over the top of the air tank regulator 104, preventing the air tank regulator 104 from moving up past the latching end 404. In other non-limiting embodiments, the latching end 404 may engage with the air tank regulator 104 by being inserted into a slot in the air tank regulator 104. In some non-limiting embodiments, the locking mechanism 200 may include at least two locking members 206 such that the latching members 206 are positioned opposite one another and spaced apart from each other in the first position at a distance that is less than the width of the air tank regulator 104.

In non-limiting embodiments or aspects, the controlling end 402 may be configured for facilitating movement of the locking member 206 from the first, locked position to the second, unlocked position. The controlling end 402 may be exposed such that it can be actuated by a user. In non-limiting embodiments or aspects, when a force is applied to the controlling end 402 in the direction of arrows A shown in FIG. 4B, the controlling end 402 may move in a pivotal direction, causing the locking member 206 to move about a pivot point 408. In non-limiting embodiments or aspects, when a force is applied to the controlling end 402, the controlling end 402 may move in a linear direction, causing the locking member 206 to move in a linear direction along the lateral axis 414. The movement in the linear direction or about the pivot point 408 may cause the locking member 206 to move out of the first, locked position and into the second, unlocked position.

In non-limiting embodiments or aspects, the latching end 404 of the locking member 206 may have a sloped surface 406. The sloped surface 406 may be at an acute angle. When the air tank regulator 104 is inserted into the receiving cradle 108, the sloped surface may face the neck of the air tank 102. The sloped surface 406 may be configured to cause the locking member 206 to move out of the locked position during the insertion of an air tank regulator 104 into the receiving cradle 108. During the insertion of the air tank regulator 104, the air tank regulator 104 may come in contact with the sloped surface 406. As the insertion of the air tank regulator 104 continues, the force of the air tank regulator 104 movement may push the sloped surface 406 to the outward direction. The force on the sloped surface 406 may cause the locking member 206 to move from the locked position to the unlocked position, allowing for the continued insertion of the air tank regulator 104. In some non-limiting embodiments or aspects where the cradle 108 is removable from the back plate 106, when the cradle 108 is inserted into cradle receiving arrangement 125 on the back plate 106, the sloped surface 406 may be configured to cause the locking member 206 to move out of the locked position. As the insertion of the cradle 108 continues, the force due to movement of the cradle 108 may push the sloped surface 406 to the outward direction. The force on the sloped surface 406 may cause the locking member 206 to move from the locked position to the unlocked position, allowing for the continued insertion of the cradle 108.

In reference to FIGS. 4A-B, shown is a non-limiting embodiment of a locking mechanism. In non-limiting embodiments or aspects, the locking mechanism may contain two locking members 206. There may be a biasing member 208 for each locking member 206 in the locking mechanism. The biasing member may bias the locking member such that when the locking member 206 is in a resting position, the biasing member 208 will encourage the locking member 206 to the locked position (as seen in FIG. 4A).

With continued reference to FIGS. 4A-B, in non-limiting embodiments or aspects, the biasing member 208 may be a spring. One end of the spring may be attached to the locking member 206. The other end of the spring may be attached to the cradle 108 or back plate 106. When the spring is compressed, the locking member may be moved out of the locked position into the unlocked position (as seen in FIG. 4B). When the spring is not compressed, the spring may cause the locking member 206 to be in the locked position.

In non-limiting embodiments or aspects, if more than one locking member 206 is included in the locking mechanism 200, each locking member 206 may move independently of the other locking member 206. Actuation of one of the multiple locking members 206 into the second unlocked position may not permit removal of the air tank 102 from the cradle 108. In this manner, the locking mechanism 200 may have a redundant safety mechanism to prevent inadvertent disengagement of the air tank 102 due to an accentual actuation of a single locking member 206.

Figure 5C:
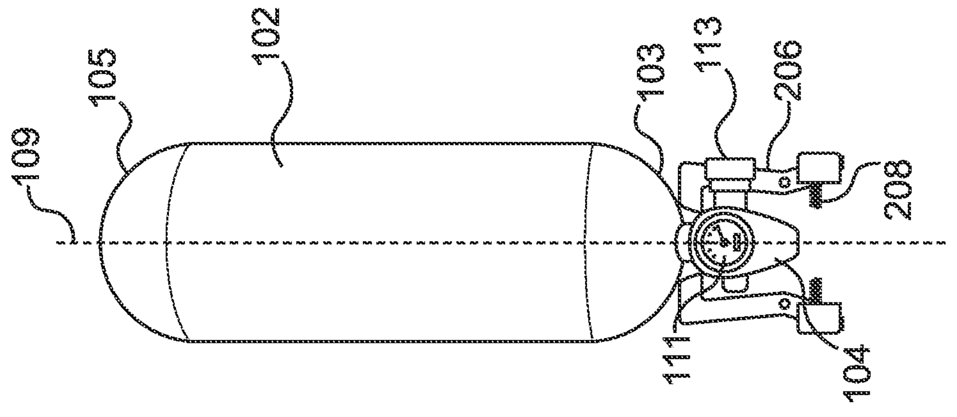
FIG. 5C is a front view of the air tank and the locking mechanism of FIG. 5A, with the air tank shown in a fully locked position.
Figure 5B:
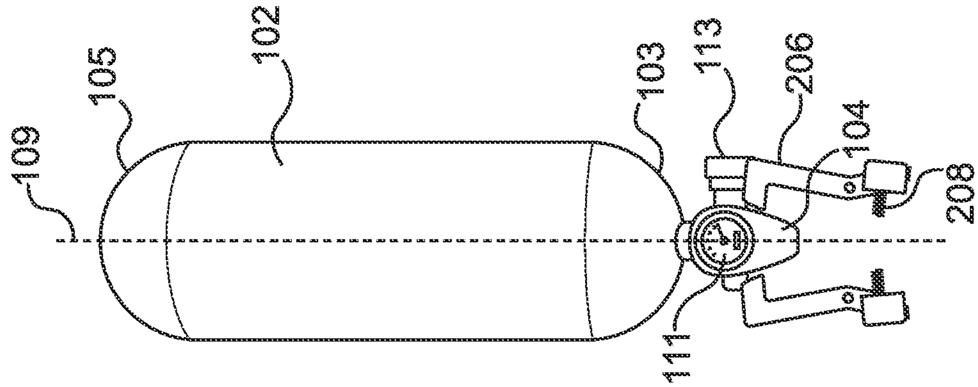
FIG. 5B is a front view of the air tank and the locking mechanism of FIG. 5A, with the air tank shown in a partially locked position.
Figure 5A:
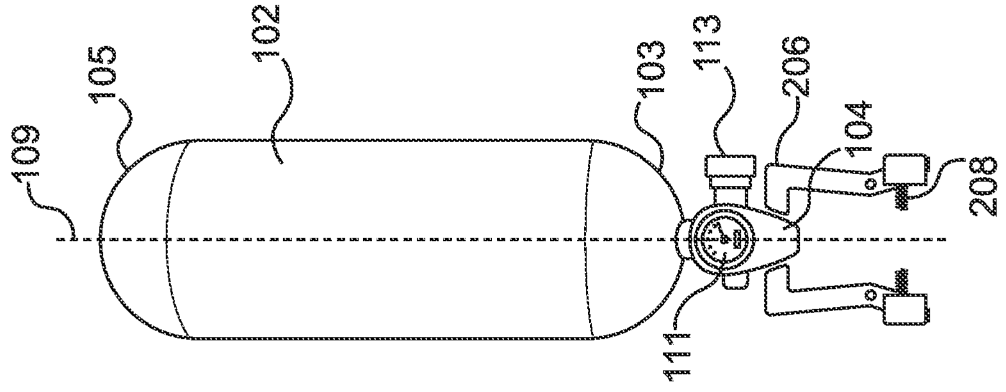
FIG. 5A is a front view of an air tank and a locking mechanism, with the air tank positioned outside the locking mechanism.

In reference to FIGS. 5A-5C, shown is a non-limiting embodiment of a locking mechanism at various stages of an air tank 102 insertion. This example non-limiting embodiment includes two locking members 206 located on opposite sides of an air tank regulator 104. The locking members have a latching end 404 and a controlling end 402, the latching end 404 having a sloped surface 406. The latching ends are spaced apart from each other in the first, locked position at a distance that is less than the width of the air tank regulator 104. The locking members 206 move in a pivotal direction about a pivot point 408. Each locking member includes a biasing member 208 which is a spring. As the air tank 102 is inserted in the space between the latching ends, the air tank regulator 104 comes in contact with the sloped surfaces 406 of the locking members 206, as shown in FIG. 5A. The continued downward motion of the air tank regulator 104 creates a force on the sloped surfaces 406 of the locking members 206. The force will cause the locking members 206 to pivot about their respective pivot points 408 to deflect the locking members 206 from the first, locked position to the second, unlocked position, as shown in FIG. 5B. The locking members transfer the force to the biasing member springs, causing the springs to compress. As the locking members 206 move outward into the unlocked position, the air tank regulator 104 is able to move past the latching ends 404 of the locking members 206. The neck of the air tank is thinner than the air tank regulator 104. Once the air tank regulator 104 has fully passed the latching ends of the locking members 206, the biasing member springs 208 will decompress, moving the locking members 206 about their respective pivot points 408 from the unlocked position to the locked position, as shown in FIG. 5C. The latching ends 404 of the locking members will be on opposite sides of the air tank neck. In the event that the air tank 102 were to move in the upward direction along the longitudinal axis of the tank 109, the air tank regulator 104 would come in contact with the underside of the latching ends 404 of the locking members 206. The latching ends 404 would then prevent the air tank regulator 104 from moving any further upward along the longitudinal axis of the tank 109, keeping the air tank 102 in place.

In further reference to FIGS. 5A-5C, in non-limiting embodiments or aspects, to remove the air tank 102, a force may be applied to the controlling ends 402 of the locking members 206 in the direction of arrows A as indicated in FIG. 4B, compressing the biasing member springs 208 and building a restoring force in the biasing member springs 208. As the biasing member springs 208 are compressed, the latching ends 404 of the locking members 206 will move in an outward direction out of the first, locked position and into the second, unlocked position as the locking member 206 pivots about the pivot point 408. When the latching ends 404 have moved outwards far enough such that the gap between the latching ends 404 is larger than the width of the air tank regulator 104, the air tank 102 can be moved in the upward direction. Once the air tank regulator 104 has moved upward along the longitudinal axis of the air tank 109 past the latching ends 404 of the locking members 206, the force may be removed from the controlling ends 402, causing the biasing member springs 208 to decompress. As the biasing member springs 208 decompress, the locking members 206 will move from the second, unlocked position to the first, locked position.

Figure 6C:
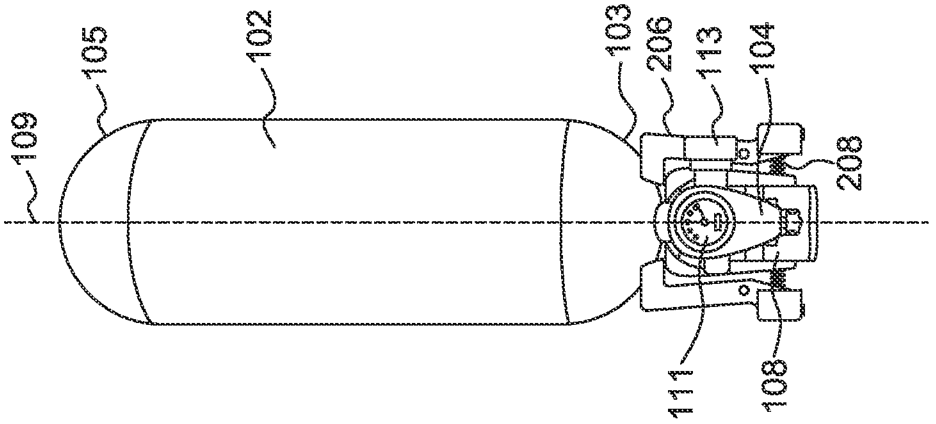
FIG. 6C is a front view of the air tank/cradle and the locking mechanism of FIG. 6A, with the air tank/cradle shown in a fully locked position.
Figure 6B:
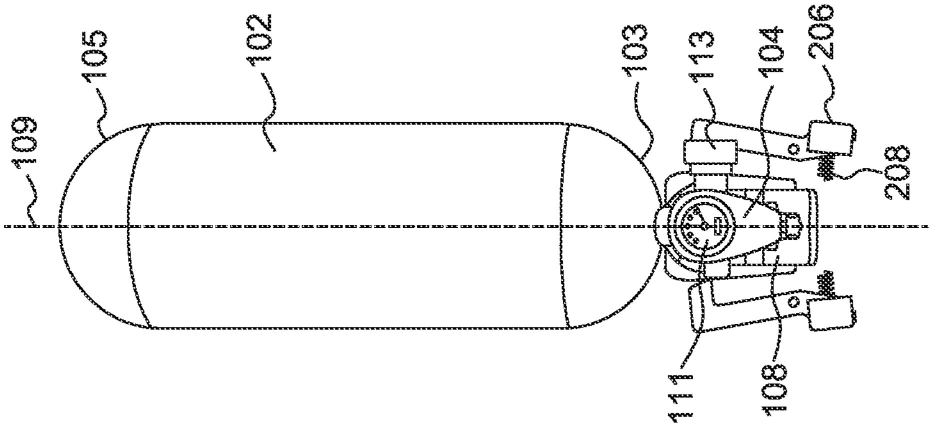
FIG. 6B is a front view of the air tank/cradle and the locking mechanism of FIG. 6A, with the air tank/cradle shown in a partially locked position.
Figure 6A:
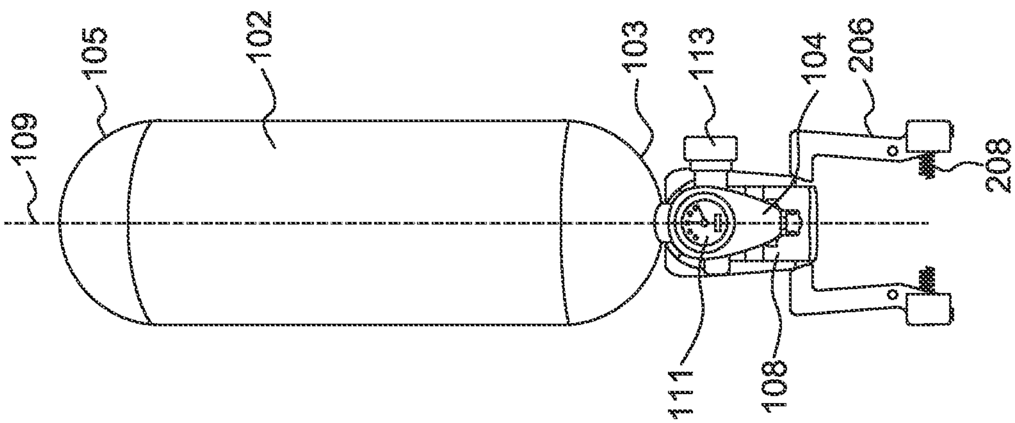
FIG. 6A is a front view of an air tank and a locking mechanism, with the cradle and air tank positioned outside the locking mechanism.

With reference to FIGS. 6A-6C, shown is a non-limiting embodiment of a locking mechanism at various stages of insertion of the combined air tank 102 and cradle 108 assembly for a locking engagement with a locking mechanism on the back plate 106. This example non-limiting embodiment includes two locking members 206 located on the back plate 106 and positioned on opposite sides of the cradle 108. The locking members have a latching end 404 and a controlling end 402, the latching end 404 having a sloped surface 406. The latching ends are spaced apart from each other in the first, locked position at a distance that is less than the width of the cradle 108. The locking members 206 move in a pivotal direction about a pivot point 408. Each locking member includes a biasing member 208 which is a spring. As the air tank 102 and the cradle 108 are inserted in the space between the latching ends, the cradle 108 comes in contact with the sloped surfaces 406 of the locking members 206, as shown in FIG. 6A. The continued downward motion of the cradle 108 creates a force on the sloped surfaces 406 of the locking members 206. The force will cause the locking members 206 to pivot about their respective pivot points 408 to deflect the locking members 206 from the first, locked position to the second, unlocked position, as shown in FIG. 5B. The locking members transfer the force to the biasing member springs, causing the springs to compress. As the locking members 206 move outward into the unlocked position, the cradle 108 is able to move past the latching ends 404 of the locking members 206. Once the cradle 108 has fully passed the latching ends of the locking members 206, the biasing member springs 208 will decompress moving the locking members 206 about their respective pivot points 408 from the unlocked position to the locked position, as shown in FIG. 6C. The latching ends 404 of the locking members will be on opposite sides of the cradle 108, thereby preventing the cradle 108 from moving any further upward along the longitudinal axis of the tank 109 keeping the air tank 102 in place.

In further reference to FIGS. 6A-6C, in non-limiting embodiments or aspects, to remove the cradle 108 and the air tank 102 from the back plate 106, a force may be applied to the controlling ends 402 of the locking members 206 in the direction of arrows A as indicated in FIG. 4B, compressing the biasing member springs 208 and building a restoring force in the biasing member springs 208. As the biasing member springs 208 are compressed, the latching ends 404 of the locking members 206 will move in an outward direction out of the first, locked position and into the second, unlocked position as the locking member 206 pivots about the pivot point 408. When the latching ends 404 have moved outwards far enough such that the gap between the latching ends 404 is larger than the width of the cradle 108, the cradle 108 and the air tank 102 can be moved in the upward direction. Once the cradle 108 has moved upward along the longitudinal axis of the air tank 109 past the latching ends 404 of the locking members 206, the force may be removed from the controlling ends 402, causing the biasing member springs 208 to decompress. As the biasing member springs 208 decompress, the locking members 206 will move from the second, unlocked position to the first, locked position.

Although the disclosure has been described in detail for the purpose of illustration based on what are currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A self-contained breathing apparatus (SCBA) comprising:
  at least one air tank having a regulator;
  a wearable harness with a back plate configured to removably receive the at least one air tank, the back plate comprising:
    a plate configured for positioning on a user's back, the plate having a tank engagement surface for engaging at least a portion of the at least one air tank;
    a receiving cradle on the plate configured to receive the regulator of the at least one air tank; and
    a locking mechanism associated with at least one of the plate and the receiving cradle for releasably locking the regulator and the receiving cradle relative to the plate, the locking mechanism comprising two locking members each configured to move between a first locked position, in which each locking member engages at least one of the regulator and the receiving cradle to restrict removal of the regulator and the receiving cradle from the plate, and a second unlocked position, in which each of the locking members disengages from at least one of the regulator and the receiving cradle, the locking members moving independently of each other and being configured to permit removal of the air tank only when both said locking members are in the second unlocked position.

2. The SCBA of claim 1, wherein the locking mechanism further comprises a biasing member for each locking member which is configured for biasing such locking member into the first locked position.

3. The SCBA of claim 2, wherein the biasing member is a spring.

4. The SCBA of claim 1, wherein at least one of the locking members is movable linearly.

5. The SCBA of claim 1, wherein at least one of the locking members is rotatable about a pivot point.

6. The SCBA of claim 1, wherein at least one of the locking members comprises a latching end opposite a controlling end,
  wherein the latching end is configured for engaging the regulator in the first locked position, and
  wherein the controlling end is configured for facilitating movement of the locking member from the first locked position to the second unlocked position.

7. The SCBA of claim 6, wherein the latching end has a sloped surface configured for automatically moving the locking member out of the first locked position during the insertion of the regulator into the receiving cradle or during the insertion of the receiving cradle into a cradle receiving arrangement on the plate.

8. The SCBA of claim 6, wherein at least one locking member is movable to the second unlocked position due to linear or pivoting movement of the controlling end.

9. A back plate for a wearable harness configured to receive at least one air tank, the back plate comprising:
  a plate configured for positioning on a user's back, the plate having a tank engagement surface configured for engaging at least a portion of the at least one air tank;
  a receiving cradle on the plate configured to receive a regulator of the at least one air tank; and
  a locking mechanism associated with at least one of the plate and the receiving cradle for releasably locking the regulator and the receiving cradle relative to the plate, the locking mechanism comprising two locking members each configured to move between a first locked position, in which each locking member engages at least one of the regulator and the receiving cradle to restrict removal of the regulator and the receiving cradle from the plate, and a second unlocked position, in which each of the locking members disengages from at least one of the regulator and the receiving cradle, the locking members moving independently of each other and being configured to permit removal of the air tank only when both said locking members are in the second unlocked position.

10. The back plate of claim 9, wherein the locking mechanism further comprises a biasing member for each locking member which is configured for biasing such locking member into the first locked position.

11. The back plate of claim 10, wherein the biasing member is a spring.

12. The back plate of claim 9, wherein at least one of the locking members is movable linearly.

13. The back plate of claim 9, wherein at least one of the locking members is rotatable about a pivot point.

14. The back plate of claim 9, wherein at least one of the locking members comprises a latching end opposite a controlling end,
  wherein the latching end is configured for engaging the regulator in the first locked position, and
  wherein the controlling end is configured for facilitating movement of the locking member from the first locked position to the second unlocked position.

15. The back plate of claim 14, wherein the latching end has a sloped surface configured for automatically moving the locking member out of the locked position during the insertion of the regulator into the receiving cradle or during the insertion of the receiving cradle into a cradle receiving arrangement on the plate.

16. The back plate of claim 14, wherein at least one of the locking members is movable to the second unlocked position due to linear or pivoting movement of the controlling end.

17. A locking mechanism for securing a regulator of an air tank to a back plate assembly of a self-contained breathing apparatus, the locking mechanism comprising:
  at least one locking member comprising a latching end opposite a controlling end, the latching end having a sloped surface at an acute angle; and
  at least one biasing member for biasing at least a portion of the at least one locking member,
  wherein the at least one locking member is movable between a first locked position, wherein the latching end is configured to engage the regulator to prevent movement of the regulator relative to the latching end, and a second unlocked position, wherein the latching end is configured to disengage the regulator to permit movement of the regulator relative to the latching end,
  wherein:
    the controlling end is configured for facilitating movement of the latching end,
  the at least one biasing member is configured to bias the latching end to the first locked position, and
  the sloped surface is configured for automatically moving the at least one locking member out of the first locked position into the second unlocked position during the insertion of the air tank into a receiving cradle or during the insertion of the receiving cradle into a cradle receiving arrangement on the plate.

18. The locking mechanism of claim 17, wherein the at least one locking member is movable to the second unlocked position due to linear or pivoting movement of the controlling end.

19. The locking mechanism of claim 17, wherein the biasing member is a spring.

20. The locking mechanism of claim 17, wherein there are two locking members each having a corresponding biasing member, the two locking members moving independently of each other and configured to permit removal of the air tank only when both said locking members are in the second unlocked position.

* * * * *